United States Patent
LeGrow

(10) Patent No.: US 6,986,160 B1
(45) Date of Patent: Jan. 10, 2006

(54) SECURITY SCANNING SYSTEM AND METHOD UTILIZING GENERIC IP ADDRESSES

(75) Inventor: Matthew A. LeGrow, Germantown, MD (US)

(73) Assignee: McAfee, Inc., Santa Clara, CA (US)

( * ) Notice: Subject to any disclaimer, the term of this patent is extended or adjusted under 35 U.S.C. 154(b) by 973 days.

(21) Appl. No.: 09/945,019

(22) Filed: Aug. 31, 2001

(51) Int. Cl.
G06F 11/30 (2006.01)
G06F 15/16 (2006.01)

(52) U.S. Cl. .............................. 726/1; 726/22; 709/224
(58) Field of Classification Search ................ 713/200, 713/201; 709/223, 224
See application file for complete search history.

(56) References Cited

U.S. PATENT DOCUMENTS

| 5,968,176 | A | * | 10/1999 | Nessett et al. ............... 713/201 |
| 6,052,718 | A | * | 4/2000 | Gifford ......................... 709/219 |
| 6,182,226 | B1 | * | 1/2001 | Reid et al. .................... 713/201 |
| 6,205,552 | B1 | * | 3/2001 | Fudge ........................... 713/201 |
| 6,321,334 | B1 | * | 11/2001 | Jerger et al. ................. 713/200 |
| 6,738,908 | B1 | * | 5/2004 | Bonn et al. ................... 713/201 |
| 6,772,347 | B1 | * | 8/2004 | Xie et al. ...................... 713/201 |
| 6,877,041 | B2 | * | 4/2005 | Sullivan et al. .............. 709/238 |
| 2003/0212779 | A1 | * | 11/2003 | Boyter et al. ................ 709/223 |

OTHER PUBLICATIONS

"Internet Scanner User Guide", 1998, Internet Security Systems, Inc., p. 1-150.*
Tannenbaum, "Computer Networks", 1996, Prentice Hall PTR, 3rd Edition, p. 416-419.*

* cited by examiner

Primary Examiner—Christopher Revak
(74) Attorney, Agent, or Firm—Zilka-Kotab, PC; Christopher J. Hamaty

(57) ABSTRACT

A system, method and computer program product is provided for configuring policies among a plurality of network components equipped with scanners. Initially, an Internet Protocol (IP) address is received at a particular one of a plurality of network components each equipped with a scanner. It should be noted that the same IP address is utilized to configure policies among each of the plurality of network components. Next, a portion of the IP address is identified by the particular one of the network components. A policy unique to the particular one of the network components is then determined utilizing the identified portion of the IP address.

22 Claims, 6 Drawing Sheets

Class A

| 0 | Network (7 bits) | Local address (24 bits) |

Class B

| 10 | Network (14 bits) | Local address (16 bits) |

Class C

| 110 | Network (21 bits) | Local address (8 bits) |

Class D

| 1110 | Multicast address (28 bits) |

100

SECURITY SCANNING SYSTEM AND METHOD UTILIZING GENERIC IP ADDRESSES

FIELD OF THE INVENTION

The present invention relates to network security scanners, and more particularly to the use of Internet Protocol (IP) addresses by network security scanners.

BACKGROUND OF THE INVENTION

IP Addresses

Definitions of an Internet Protocol (IP) address may vary in the context of various IP versions. One version, IP Version 4 (IPv4) sets forth a 32-bit address. IP Version 6 (IPv6) provides a description of a newer 128-bit IP address. In the context of IPv4, an IP address is a 32-bit number that identifies each sender or receiver of information that is sent in packets across the Internet.

When one requests an HTML page or sends e-mail, the IP part of Transfer Control Protocol (TCP/IP) includes an IP address in the message and sends it to the IP address that is obtained by looking up the domain name in the Uniform Resource Locator (URL) that is requested or in the e-mail address. At the other end, the recipient can see the IP address of the Web page requestor or the e-mail sender and can respond by sending another message using the IP address it received.

An IP address has traditionally has two parts: the identifier of a particular network on the Internet and an identifier of the particular device (i.e. server, workstation, etc.) within that network.

The network part of the IP address identifies a particular network on the Internet. As is well known, the Internet provides an interconnection of many individual networks. The IP is basically the set of rules for one network communicating with any other. Each network must know the address thereof and that of any other networks with which it communicates. To be part of the Internet, an organization must have a particular Internet network number which is included in the network part of the IP address.

The local or host part of the IP address, on the other hand, identifies which specific machine or host in a network is sending or receiving a message. In use, the IP address must include both the unique network number and host number (which is unique within the network).

Since networks vary in size, there are four different basic address formats or classes to consider when subnetting a network. Table 1 illustrates examples of the various classes.

TABLE 1

Class A addresses are for large networks with many devices.
Class B addresses are for medium-sized networks.
Class C addresses are for small networks (fewer than 256 devices)
Class D addresses are multicast addresses.

Prior art FIG. 1 illustrates the various address structures 100 associated with the different classes set forth in Table 1. The IP address is usually expressed as four decimal numbers, each representing eight bits, separated by periods.

For Class A IP addresses, the numbers represent "network.local.local.local"; for a Class C IP address, they represent "network.network.network.local". The number version of the IP address may be represented by a name or series of names called the domain name.

Network Security Systems

Computer network attacks can take many forms and any one attack may include many security events of different types. Security events are anomalous network conditions each of which may cause an anti-security effect to a computer network. Security events include producing network damage through mechanisms such as viruses, worms, or Trojan horses and overwhelming the network's capability in order to cause denial of service, and so forth.

Security systems often employ security risk-management tools, i.e. "scanners," to search for known types of security events in the form of network service vulnerabilities, and also possibly for malicious programs such as viruses, worms, and Trojan horses.

In one particular type of network scanner system, a scanning agent is positioned on each of a plurality of network components. Each scanning agent includes the capability of scanning the associated network component in accordance with a particular set of rules, i.e. policy. By this design, policies may be sent to the network components from a centralized location such that a particular type of scan may be executed thereon.

In use, a controller at the centralized location must send the policies to each of the network components individually. In other words, a unique IP address representing a target machine, or network, must be generated for each instance of policy distribution. Often, one scanning policy is enforced across multiple different networks and/or network components. Unfortunately, this requires scheduling multiple separate tasks even though the only thing that changed is the target machine or network.

There is thus a need for configuring scanning policies in a more efficient manner.

DISCLOSURE OF THE INVENTION

A system, method and computer program product is provided for configuring policies among a plurality of network components equipped with scanners. Initially, an Internet Protocol (IP) address is received at a particular one of a plurality of network components each equipped with a scanner. It should be noted that the same IP address is utilized to configure policies among each of the plurality of network components. Next, a portion of the IP address is identified by the particular one of the network components. A policy unique to the particular one of the network components is then determined utilizing the identified portion of the IP address.

In one embodiment, the network components may include hosts. Still yet, the portion of the IP address from which the policy is determined may include a network part of the IP address. Moreover, the policy may dictate which hosts are to be scanned.

In another embodiment, the portion of the IP address from which the policy is determined may include a predetermined number of bits of the IP address. Such bits may be reserved for defining an interface index value. The interface index value may be used to identify an interface of the network component to be scanned in accordance with the policy. In use, the interface index value may be utilized to look up the interface in an index table.

In a similar manner, a plurality of the bits may be reserved for defining a subnet selector value. The subnet selector value may indicate which subnet mask to use. In operation, the particular network component may be scanned utilizing the determined policy.

From the perspective of a scanning administrator, a method is provided for generating an IP address for configuring a policy among a plurality of network components equipped with scanners. Initially, an IP address is generated. Next, the IP address is transmitted to a plurality of network components each equipped with a scanner. In use, the network components are each capable of identifying a portion of the IP address, and determining a policy unique to the network component utilizing the identified portion of the IP address.

Associated with the previous embodiments is an IP address data structure for configuring a policy among a plurality of network components equipped with scanners. First provided is an interface object for identifying an interface to be scanned in accordance with a policy. Associated therewith is a subnetwork object for identifying a mask to use in determining a subnetwork to be scanned in accordance with the policy.

A technique is thus provided for embedding information in an IP address for scanning purposes. Initially, information is embedded in an IP address. The IP address is then sent to a plurality of scanners. Such information is capable of being used by a scanner for scanning purposes.

BRIEF DESCRIPTION OF THE DRAWINGS

Prior art

DESCRIPTION OF THE PREFERRED EMBODIMENTS

Figure 1:
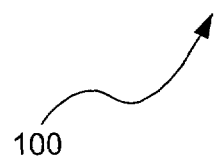
FIG. 1 illustrates the various address structures associated with the different classes set forth in Table 1.
Figure 2:
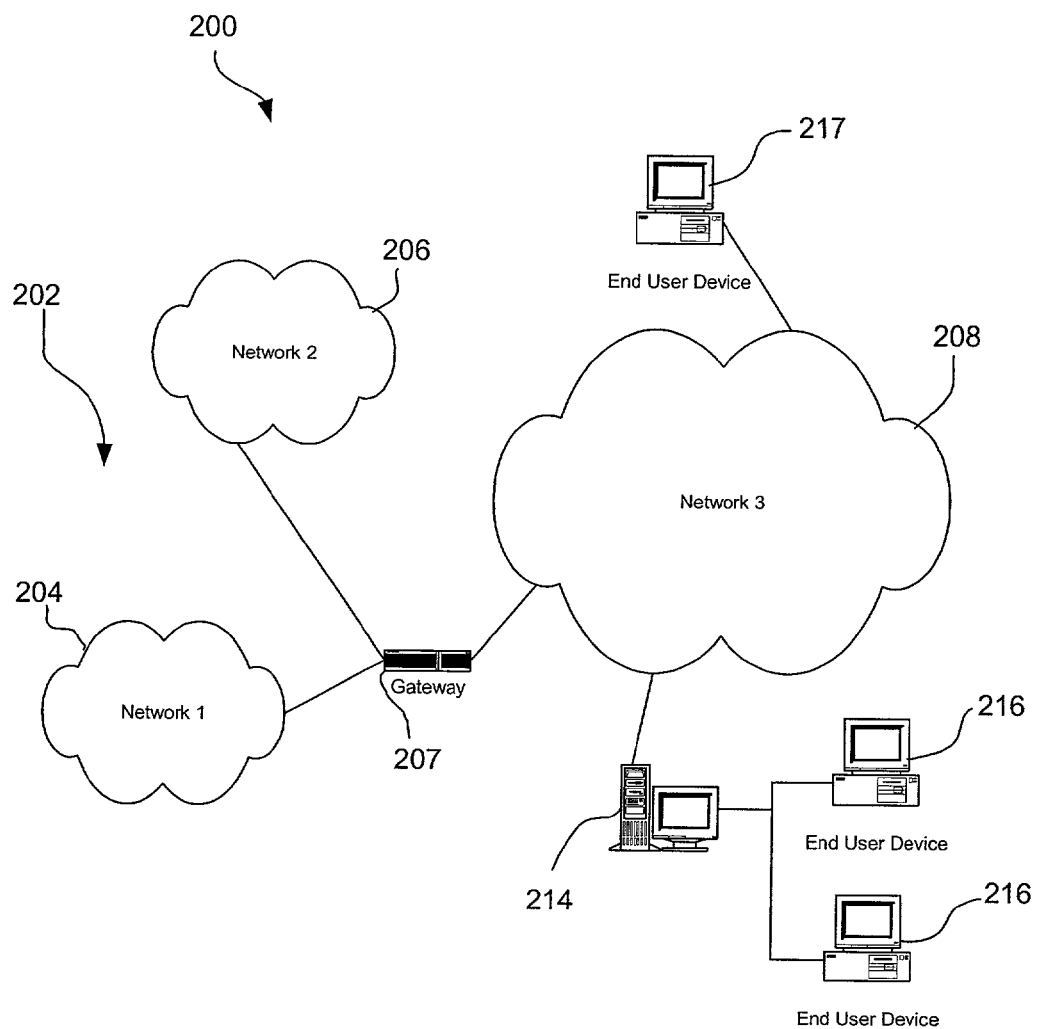
FIG. 2 illustrates a network architecture, in accordance with one embodiment.

FIG. 2 illustrates a network architecture 200, in accordance with one embodiment. As shown, a plurality of networks 202 are provided including a first network 204 and a second network 206. Also included is at least one gateway 207 coupled between the networks 202 and a third network 208. In the context of the present network architecture 200, the networks 204, 206, 208 may each take any form including, but not limited to a local area network (LAN), a wide area network (WAN) such as the Internet, etc. Further, any number of networks may be included.

In use, the gateway 207 serves as an entrance point from the networks 202 to the third network 208. As such, the gateway 207 may function as a router, which is capable of directing a given packet of data that arrives at the gateway 207, and a switch, which furnishes the actual path in and out of the gateway 207 for a given packet.

Further included is at least one server 214 coupled to the third network 208, and which is accessible from the networks 202 via the gateway 207. It should be noted that the server(s) 214 may include any type of computing device/groupware. Coupled to each server 214 is a plurality of user devices 216. Such user devices 216 may include a desktop computer, lap-top computer, hand-held computer, printer or any other type of logic. It should be noted that a user device 217 may also be directly coupled to any of the networks, in one embodiment.

Further provided is a plurality of scanners (not shown) that may be installed on any one of the network components shown in FIG. 2. In the context of the present description, a network component may refer to any device or subnetwork on a network. It should be noted that each of the network components include a designated Internet Protocol (IP) address. In one embodiment, the network components include hosts. Further, the IP may include IPv4. Of course, other IP versions may be utilized as well (i.e. IPv6).

In use, the scanners are capable of executing a scanning procedure in accordance with instructions, rules, policies, etc. received from a remote administrator. More information regarding the operation of the scanners and the remote administrator will be set forth hereinafter in greater detail.

Figure 3:
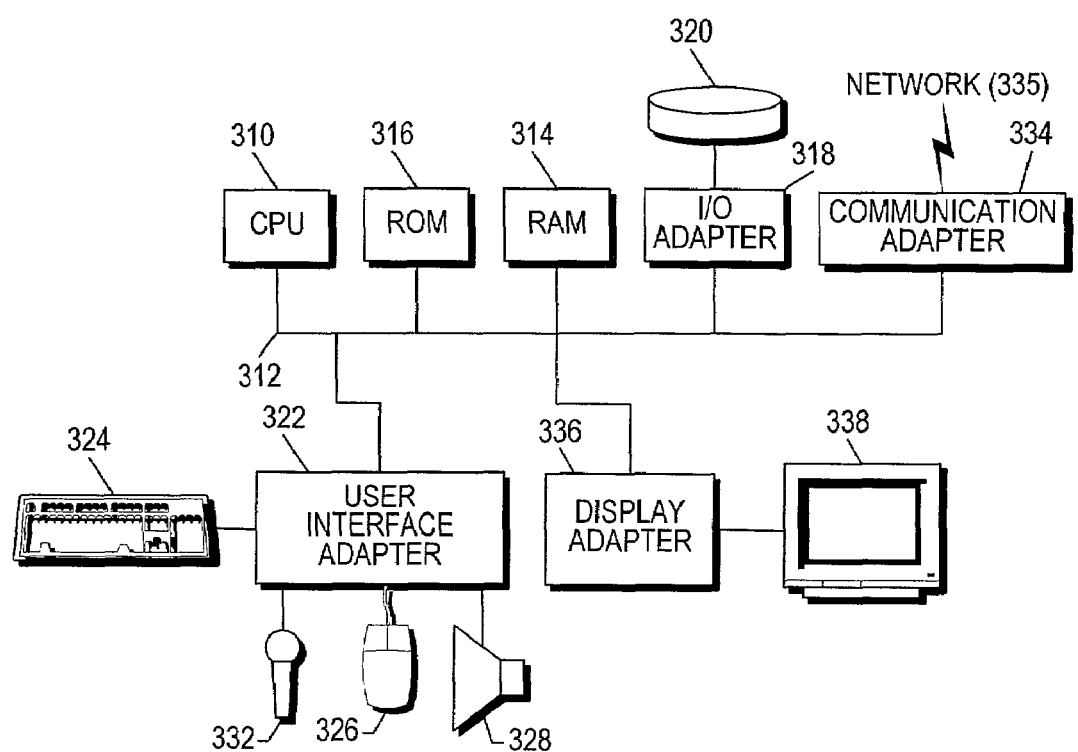
FIG. 3 shows a representative hardware environment that may be associated with the various network components of FIG. 2, in accordance with one embodiment.

FIG. 3 shows a representative hardware environment that may be associated with the various network components of FIG. 2, in accordance with one embodiment. Such figure illustrates a typical hardware configuration of a workstation in accordance with a preferred embodiment having a central processing unit 310, such as a microprocessor, and a number of other units interconnected via a system bus 312.

The workstation shown in FIG. 3 includes a Random Access Memory (RAM) 314, Read Only Memory (ROM) 316, an I/O adapter 318 for connecting peripheral devices such as disk storage units 320 to the bus 312, a user interface adapter 322 for connecting a keyboard 324, a mouse 326, a speaker 328, a microphone 332, and/or other user interface devices such as a touch screen and a digital camera (not shown) to the bus 312, communication adapter 334 for connecting the workstation to a communication network 335 (e.g., a data processing network) and a display adapter 336 for connecting the bus 312 to a display device 338. The workstation may have resident thereon an operating system such as the Microsoft Windows NT, Windows/2000 Operating System (OS).

In use, the scanners at each of the network components are capable of executing a scanning procedure in accordance with instructions, rules, policies, etc. received from a remote administrator. By this design, the remote administrator may control the manner in which the scanners scan the remaining network components. In the context of the present embodiment, any one of the network components shown in FIG. 2 may act as the remote administrator.

In one embodiment, the remote administrator controls the scanning by sending "general" IP addresses to the scanners on select network components. In the context of the present description, such general IP addresses refer to any IP address capable of being received by multiple network components. Moreover, embedded in the general IP address is information for being used by the recipient scanner to determine which network components should be scanned, and/or any other aspects of the desired scanning procedure.

By this design, many scanners may be instructed with a single general IP address. Moreover, the scanners may extract information from such single IP address in order to determine which network components should be scanned. One example of how this is accomplished will be set forth hereinafter in greater detail.

Figure 4:
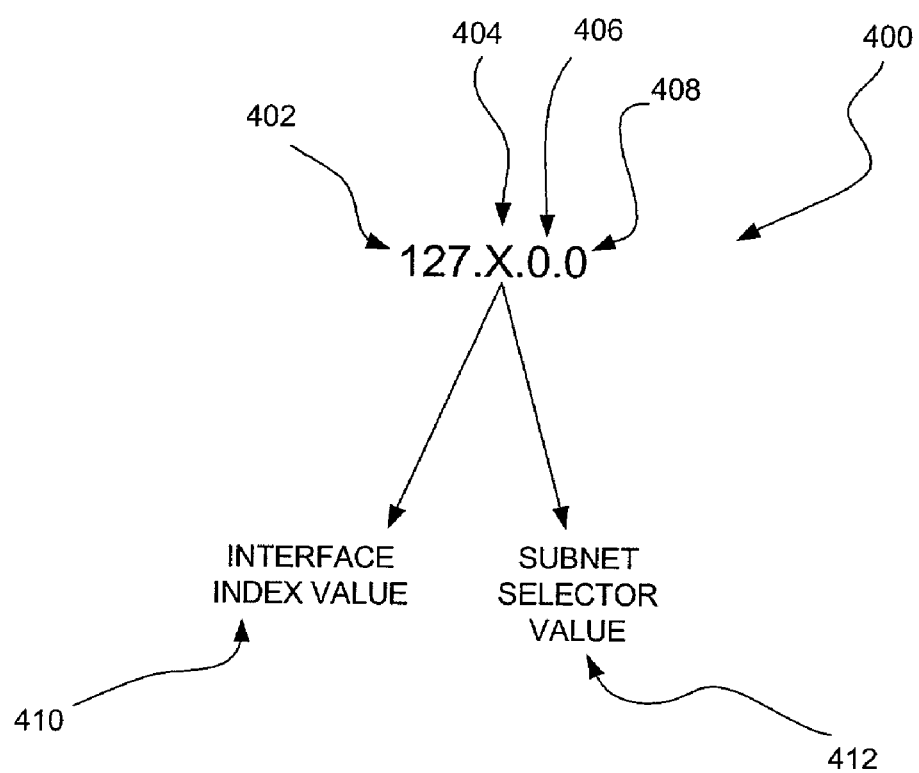
FIG. 4 illustrates an exemplary general IP address, in accordance with one embodiment.

FIG. 4 illustrates an exemplary general IP address 400, in accordance with one embodiment. As shown, a first portion 402 indicates that the general IP address 400 is a "reserved" address. It should be understood that a reserved address is that which the Internet can not route. In one example, the first portion 402 may designate "127." In the alternative, a broadcast IP address may be used.

A second portion 404 of the general IP address 400 is used to carry information that can be used by a scanner for scanning purposes. In particular, such information identifies which network components should be scanned by the scanner. It should be noted that the general IP address 400 further includes a third portion 406 and a fourth portion 408 which are each designated as "0" to further indicate that the general IP address 400 is reserved.

As long as at least one value is left un-remapped, the user can still enter an IP address that maps to a local network component. This may be "127.0.0.1." An associated graphical user interface may disallow the user from using any 127.x.x.x addresses other than 127.0.0.1, so that more bits may be used from this IP address to encode additional remappable values.

The second portion 404 of the general IP address 400 indicates both an interface index value 410 and a subnet selector value 412. The interface index value 410 identifies a specific interface that is to be scanned. Such interface includes an IP address that may refer to a network card, communication adapter, or anything else that is capable of connecting the network component to a network. In one embodiment, the interface index value 410 is a 3-bit value that correlates with an IP address according to a table.

Figure 5:
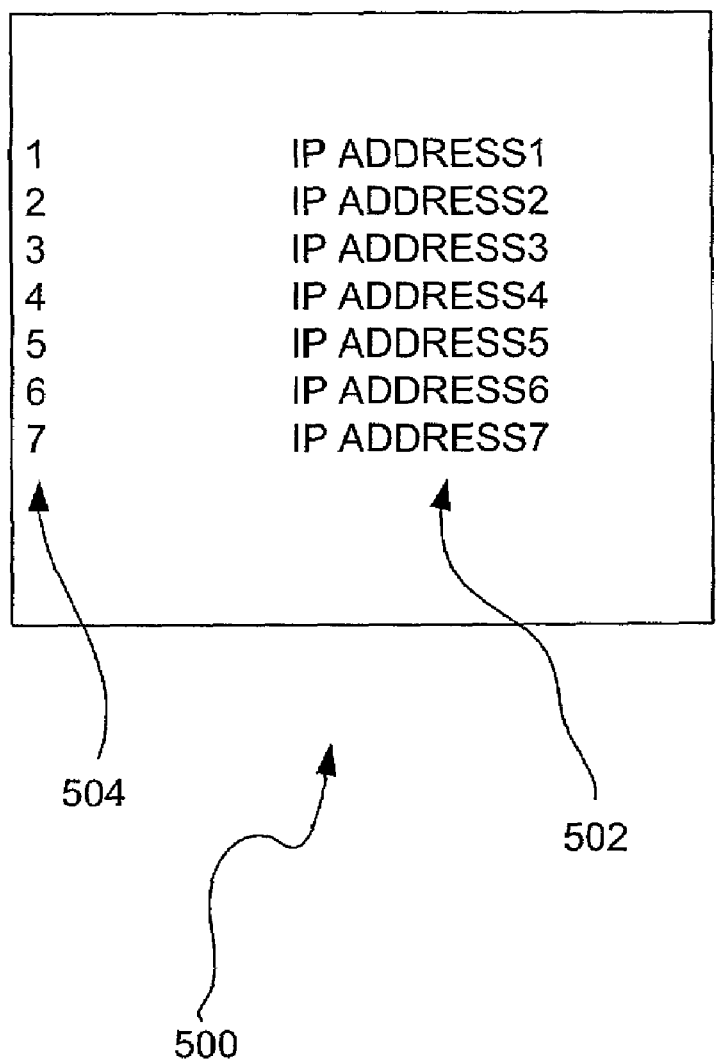
FIG. 5 illustrates an interface index value table that may be used in the context of the present embodiment.

FIG. 5 illustrates an interface index value table 500 that may be used in the context of the present embodiment. As shown, a plurality of interface IP addresses 502 are provided, each with an associated interface index value 504. In use, the interface index value table 500 may be generated by: enumerating all interfaces of a network component in a table, removing predetermined interfaces from the table, and sorting remaining interfaces in accordance with IP addresses.

On the other hand, the subnet selector value 412 indicates a subnet mask that is to be used during the scanning. Such masks are well known. A mask is simply a screen of numbers that indicates which numbers to look at underneath. In a binary mask, a "1" over a number indicates "Look at the number underneath"; a "0" indicates "Don't look." Using a mask saves the router having to handle the entire 32 bit address; it can simply look at the bits selected by the mask. In one embodiment, the subnet selector value 412 is a 5-bit value that specifies a particular mask. More information regarding the manner in which the above values are extracted from an IP address will be set forth in greater detail during reference to FIG. 6.

As such, an IP address data structure is provided for configuring a policy among a plurality of network components equipped with scanners. First provided is an interface object (i.e. interface index value 504) for identifying an interface to be scanned in accordance with a policy. Associated therewith is a subnetwork object (i.e. subnet selector value 412) for identifying a mask to use in determining a subnetwork to be scanned in accordance with the policy.

Figure 6:
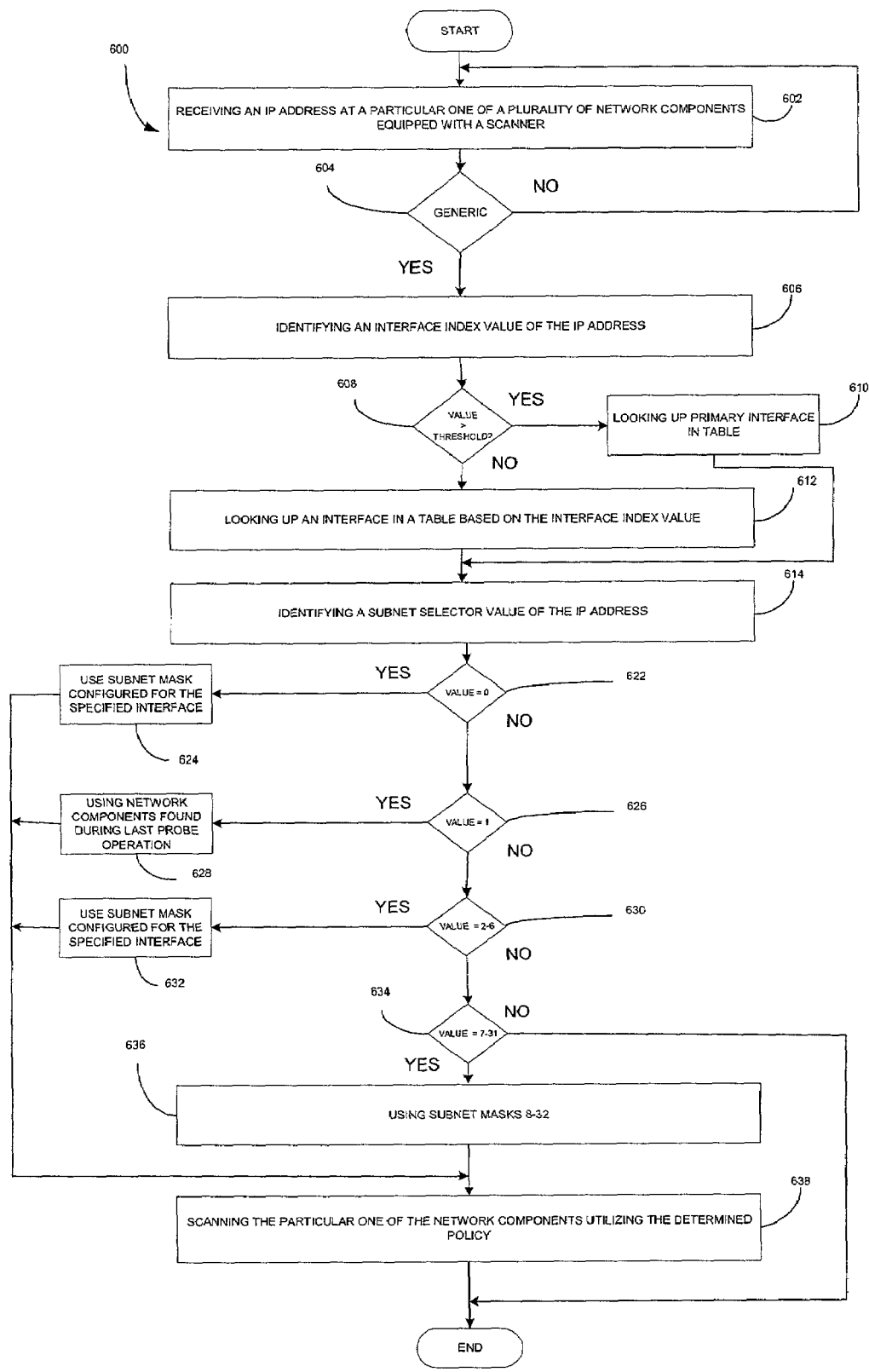
FIG. 6 illustrates an exemplary method of extracting the appropriate interface index value and subnet selector value from the general IP address shown in FIG. 4.

FIG. 6 illustrates an exemplary method 600 of extracting the appropriate interface index value 410 and subnet selector value 412 from the general IP address 400 shown in FIG. 4. It should be noted that the interface index value 410, subnet selector value 412 and/or any other information may be extracted from the general IP address in any desired manner.

By way of example, in operation 602, an IP address is received at a particular one of a plurality of network components equipped with a scanner. As mentioned earlier, the same IP address is utilized to configure policies among a plurality of the network components.

Next, in decision 604, it is determined whether the received IP address is generic. It should be noted that the IP address is determined to be generic if it takes on the format set forth in FIG. 4. If not, the IP address is handled in any conventional manner.

If, however, it is determined that the received IP address is generic in decision 604, an interface index value of the generic IP address is extracted. See operation 606. It is then determined in decision 608 whether the interface index value exceeds a predetermined amount. Such predetermined amount is usually set as the number of entries in the interface index table. To this end, if it is determined that the interface index value does not correlate with any particular interface index value in the table, a primary interface is selected in operation 610. Such primary interface may be predetermined to be the most widely used interface, or selected in any other way.

If it is determined in decision 608 that the interface index value does not exceed a predetermined amount, an interface is looked up utilizing a table similar to that of FIG. 5. This is accomplished by identifying the appropriate interface index value 504 of the table 500 and selecting the corresponding IP address 502 of the interface.

As an option, an interface index value of "0" may never be used. This may be done to ensure that this byte will never be "0," and thus make it easy to distinguish a legitimate local host address (i.e. 127.0.0.1) from any of the remapped addresses. In the one embodiment, valid values for the table may be "1–7" with "1" being the default.

As another option, one may use the same list of interfaces found in the agent properties of the scanner. This has the advantage that the user may be certain which interfaces are in the list.

Next, in operation 614, subnet selector value of the IP address is identified by the particular one of the network components. First, it is determined in decision 622, whether the subnet selector value is equal to "0." A value of "0" tells the scanner to use the subnet mask which is configured for the specified interface. Note operation 624. To avoid scanning too many network components, the scanner may optionally act as though a class B subnet (/16) was configured, if the configured subnet mask indicates anything larger than a class B network.

Next, it is determined in decision 626, whether the subnet selector value is equal to "1." A value of "1" tells the scanner to use the network components found during a last probe operation. See operation 628.

The expectation here is that the user will have, at some time in the past, run a probe of the instant network. The value of "1" is intended to be used in cases where the user would normally specify a hosts.txt file. In one design, the user may have to specify the same hosts.txt file for all scanners (if he/she set the policy at a branch node) or go and individually configure a different hosts.txt file for each leaf node at the bottom level. This feature gives the user the option of running a probe (perhaps telling each network component to scan the subnet thereof) and then having each network component use the results of its own probe in future scans.

Thereafter, it is determined in decision 630, whether the subnet selector value is equal to "2–6." Values of 2–6 are presently illegal, and may be mapped to 0, causing the scanner to use the subnet mask as configured. Note operation 632.

It is also determined in decision 634, whether the subnet selector value is equal to "7–31." Values of 7–31 represent subnet masks from /8 to /32 respectively. Note operation 336. It should be noted that a subnet mask of /32 essentially tells the agent to scan itself.

From the perspective of a scanning administrator, a method is thus provided for generating an IP address for configuring a policy among a plurality of network components equipped with scanners. Initially, an IP address is generated. Next, the IP address is transmitted to a plurality of network components each equipped with a scanner. In use, the network components are each capable of identifying a portion of the IP address, and determining a policy unique to the network component utilizing the identified portion of the IP address.

The present embodiment is thus adapted for embedding information in an IP address for scanning purposes. Initially, information is embedded in an IP address. The IP address is then sent to a plurality of scanners. Such information is capable of being used by a scanner for scanning purposes.

In particular, the present scheme lists certain special IP addresses that may be mapped (on the agent side, probably in the plugin dll) to special meanings. The intent is that the administrator user can specify an identical, generic IP address for an entire subtree of network components, which will then be mapped into real IP addresses that are appropriate for that specific scanner.

The user is thus allowed to specify the same (remapped) IP address for as many scanners as possible, while still having each of these scanners perform the correct scan. This allows the user to take maximum advantage of the administrator's policy inheritance structure, and saves them from having to configure the IP address of each leaf node individually.

While various embodiments have been described above, it should be understood that they have been presented by way of example only, and not limitation. For example, any of the network components may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for configuring policies among a plurality of network components equipped with scanners, comprising:
   (a) receiving an Internet Protocol (IP) address at a particular one of a plurality of network components equipped with a scanner, wherein the same IP address is utilized to configure policies among a plurality of the network components;
   (b) identifying a portion of the IP address at the particular one of the network components; and
   (c) determining a policy unique to the particular one of the network components utilizing the identified portion of the IP address;
wherein the portion of the IP address includes a predetermined number of bits of the IP address;
wherein a plurality of the bits are reserved for defining a subnet selector value;
wherein the subnet selector value indicates which subnet mask to use.

2. The method as recited in claim 1, wherein the network components include hosts.

3. The method as recited in claim 1, wherein the IP is IPv4.

4. The method as recited in claim 1, wherein the portion of the IP address includes a network part of the IP address.

5. The method as recited in claim 1, wherein the policy dictates which hosts are to be scanned.

6. The method as recited in claim 1, wherein a plurality of the bits are reserved for defining an interface index value.

7. The method as recited in claim 6, and further comprising utilizing the interface index value to identify an interface of the network component to be scanned in accordance with the policy.

8. The method as recited in claim 7, wherein the interface index value is utilized to look up the interface in an index table.

9. The method as recited in claim 1, and further comprising scanning the particular one of the network components utilizing the determined policy.

10. The method as recited in claim 1, wherein the particular one of the network components is equipped with a scanner adapted to utilizing the policy for scanning purposes.

11. A computer program product embodied on a computer readable medium for configuring policies among a plurality of network components equipped with scanners, comprising:
   (a) computer code for receiving an Internet Protocol (IP) address at a particular one of a plurality of network components equipped with a scanner, wherein the same IP address is utilized to configure policies among a plurality of the network components;
   (b) computer code for identifying a portion of the IP address at the particular one of the network components; and
   (c) computer code for determining a policy unique to the particular one of the network components utilizing the identified portion of the IP address;
wherein the portion of the IP address includes a predetermined number of bits of the IP address;
wherein a plurality of the bits are reserved for defining a subnet selector value;
wherein the subnet selector value indicates which subnet mask to use.

12. The computer program product as recited in claim 11, wherein the network components include hosts.

13. The computer program product as recited in claim 11, wherein the IP is IPv4.

14. The computer program product as recited in claim 11, wherein the portion of the IP address includes a network part of the IP address.

15. The computer program product as recited in claim 11, wherein the policy dictates which hosts are to be scanned.

16. The computer program product as recited in claim 11, wherein a plurality of the bits are reserved for defining an interface index value.

17. The computer program product as recited in claim 16, and further comprising computer code for utilizing the interface index value to identify an interface of the network component to be scanned in accordance with the policy.

18. The computer program product as recited in claim 17, wherein the interface index value is utilized to look up the interface in an index table.

19. The computer program product as recited in claim 11, and further comprising computer code for scanning the particular one of the network components utilizing the determined policy.

20. The computer program product as recited in claim 11, wherein the particular one of the network components is equipped with a scanner adapted to utilizing the policy for scanning purposes.

21. A system for configuring policies among a plurality of network components equipped with scanners, comprising:
 (a) logic for receiving an Internet Protocol (IP) address at a particular one of a plurality of network components equipped with a scanner, wherein the same IP address is utilized to configure policies among a plurality of the network components;
 (b) logic for identifying a portion of the IP address at the particular one of the network components; and
 (c) logic for determining a policy unique to the particular one of the network components utilizing the identified portion of the IP address;
wherein the portion of the IP address includes a predetermined number of bits of the IP address;
wherein a plurality of the bits are reserved for defining a subnet selector value;
wherein the subnet selector value indicates which subnet mask to use.

22. A method for generating an Internet Protocol (IP) address for configuring a policy among a plurality of network components equipped with scanners, comprising:
 (a) generating an IP address;
 (b) transmitting the IP address to a plurality of network components each equipped with a scanner;
 (c) wherein the network components are each capable of identifying a portion of the IP address, and determining a policy unique to the network component utilizing the identified portion of the IP address;
wherein the portion of the IP address includes a predetermined number of bits of the IP address; PS wherein a plurality of the bits are reserved for defining a subnet selector value;
wherein the subnet selector value indicates which subnet mask to use.

* * * * *

UNITED STATES PATENT AND TRADEMARK OFFICE
CERTIFICATE OF CORRECTION

PATENT NO.        : 6,986,160 B1
APPLICATION NO.   : 09/945019
DATED             : January 10, 2006
INVENTOR(S)       : LeGrow It is certified that error appears in the above-identified patent and that said Letters Patent is hereby corrected as shown below:

Col. 10, line 12, delete "PS".

Signed and Sealed this

Twenty-seventh Day of May, 2008

JON W. DUDAS
*Director of the United States Patent and Trademark Office*